(12) United States Patent
Jiang et al.

(10) Patent No.: US 10,845,697 B2
(45) Date of Patent: Nov. 24, 2020

(54) TRANSPARENT FILM FOR USE IN PROJECTING SYSTEM

(71) Applicant: BJ Tek Corporation, Beijing (CN)

(72) Inventors: He-Yuan Jiang, Taipei (TW);
Hsiu-Cheng Chang, Taoyuan (TW);
Ching-Han Chang, Taoyuan (TW)

(73) Assignee: BJ TEK CORPORATION, Beijing (CN)

(*) Notice: Subject to any disclaimer, the term of this patent is extended or adjusted under 35 U.S.C. 154(b) by 0 days.

(21) Appl. No.: 16/708,613

(22) Filed: Dec. 10, 2019

(65) Prior Publication Data

US 2020/0192211 A1 Jun. 18, 2020

(30) Foreign Application Priority Data

Dec. 14, 2018 (CN) .......................... 2018 1 1534227

(51) Int. Cl.
| | |
|---|---|
| *G03B 21/62* | (2014.01) |
| *G02B 5/02* | (2006.01) |
| *H04N 9/31* | (2006.01) |
| *G03B 21/10* | (2006.01) |
| *G03B 21/625* | (2014.01) |
| *G03B 21/56* | (2006.01) |

(52) U.S. Cl.
CPC ............ *G03B 21/62* (2013.01); *G02B 5/0278* (2013.01); *G03B 21/10* (2013.01); *G03B 21/56* (2013.01); *G03B 21/625* (2013.01); *H04N 9/3141* (2013.01)

(58) Field of Classification Search
CPC ...... G03B 21/62; G03B 21/625; G03B 21/56; G03B 21/10; H04N 9/3141

USPC ........................................................ 359/460
See application file for complete search history.

(56) References Cited

U.S. PATENT DOCUMENTS

| | | | | |
|---|---|---|---|---|
| 3,832,032 A * | 8/1974 | Shimada | .............. | G03B 21/625 |
| | | | | 359/456 |
| 5,563,738 A * | 10/1996 | Vance | .................. | G02B 5/0215 |
| | | | | 359/452 |
| 5,870,224 A * | 2/1999 | Saitoh | .................. | G03B 21/625 |
| | | | | 359/455 |
| 6,204,971 B1 * | 3/2001 | Morris | .................... | C03C 12/00 |
| | | | | 359/619 |
| 6,278,546 B1 * | 8/2001 | Dubin | .................. | G03B 21/625 |
| | | | | 359/452 |
| 6,344,263 B1 * | 2/2002 | Moshrefzadeh | ..... | G03B 21/625 |
| | | | | 428/206 |
| 6,348,993 B1 * | 2/2002 | Hori | ........................ | G03B 21/62 |
| | | | | 359/443 |
| 6,469,830 B1 * | 10/2002 | Dubin | .................. | G03B 21/625 |
| | | | | 359/449 |

(Continued)

*Primary Examiner* — Clayton E. LaBalle
(74) *Attorney, Agent, or Firm* — WPAT, PC

(57) ABSTRACT

A transparent film is used with a projector which emits a projected light. The transparent film includes a transparent substrate; a light-scattering layer disposed at an upstream position of the transparent substrate with respect to the projected light, and including a plurality of microstructures configured to scatter the projected light; and a light-blocking layer disposed at an upstream position of the light-scattering layer with respect to the projected light, and including a plurality of separate light-blocking units, which are configured to partially block the projected light and partially allow the projected light to reach the light-scattering layer.

14 Claims, 8 Drawing Sheets

(56) References Cited

U.S. PATENT DOCUMENTS

| | | | | |
|---|---|---|---|---|
| 6,535,333 B1* | 3/2003 | Piepel | G03B 21/56 | 349/9 |
| 6,912,089 B2* | 6/2005 | Nakagawa | G02B 5/0226 | 359/453 |
| 7,198,372 B2* | 4/2007 | Aeling | B44C 3/02 | 348/744 |
| 7,253,953 B2* | 8/2007 | Browning | B32B 17/10036 | 359/452 |
| 7,324,277 B2* | 1/2008 | Choi | G03B 21/625 | 359/452 |
| 7,453,634 B2* | 11/2008 | Hannington | G02B 1/11 | 359/453 |
| 7,486,342 B2* | 2/2009 | Mathey | G02F 1/133509 | 349/16 |
| 7,495,829 B2* | 2/2009 | Peterson | G03B 21/60 | 359/459 |
| 8,570,651 B1* | 10/2013 | Choi | G03B 21/58 | 359/443 |
| 2004/0023019 A1* | 2/2004 | Vandenberg | B29D 11/00615 | 428/323 |
| 2004/0070837 A1* | 4/2004 | Oda | G03B 21/625 | 359/620 |
| 2005/0018306 A1* | 1/2005 | Yoshida | G02B 3/0031 | 359/619 |
| 2006/0001959 A1* | 1/2006 | Senoue | G02B 5/0825 | 359/449 |
| 2006/0056022 A1* | 3/2006 | Yeo | G03B 21/602 | 359/460 |
| 2006/0098279 A1* | 5/2006 | Yamauchi | G03B 21/56 | 359/449 |
| 2006/0181769 A1* | 8/2006 | Kumasawa | G03B 21/604 | 359/449 |
| 2006/0256433 A1* | 11/2006 | Yoshikawa | G03B 21/60 | 359/460 |
| 2007/0015068 A1* | 1/2007 | Nagahama | B29D 11/00278 | 430/5 |
| 2007/0121207 A1* | 5/2007 | Miyaki | G03B 21/625 | 359/455 |
| 2008/0180796 A1* | 7/2008 | Willard | G03B 21/56 | 359/443 |
| 2008/0285125 A1* | 11/2008 | Lee | G02B 6/08 | 359/449 |
| 2008/0297887 A1* | 12/2008 | Yoshihara | G02B 5/0242 | 359/361 |
| 2009/0009861 A1* | 1/2009 | Hyobu | G02B 5/0242 | 359/456 |
| 2010/0091366 A1* | 4/2010 | Shiau | G03B 21/60 | 359/455 |
| 2016/0370509 A1* | 12/2016 | Nakamura | G02B 3/0043 | |
| 2018/0031830 A1* | 2/2018 | Koike | G02B 3/0043 | |

* cited by examiner

TRANSPARENT FILM FOR USE IN PROJECTING SYSTEM

FIELD OF THE INVENTION

The present invention relates to a transparent film, and more particular to a transparent film adapted to be used for projection. The present invention further relates to a projecting system.

BACKGROUND OF THE INVENTION

In existing projection systems, a white and opaque screen or wall is generally used for displaying projected images. With an opaque screen or wall, it is inherent that the projected image can only be shown on a single face, and viewers seated on the opposite side of the screen or wall would not be able to see the projected image. Meanwhile, as blocked by the opaque screen, the articles behind the screen, e.g. window decoration or artwork, could not be seen. The space where the screen is allocated is thus improperly occupied.

For solving the above problems, it has been proposed to use a transparent film as a projection screen. However, when using a transparent screen with a common projector for horizontal projection, the intense light emitted from the projector would directly reach eyes of viewers and make the viewers difficult in watching the screen. Therefore, it is impractical to use a transparent film for horizontal projection. Nevertheless, it is possible to use a transparent film for vertical projection, either downwards or upwards, because the intense light does not hit the eyes of viewers directly.

Although a transparent screen can be used in certain applications, there are still some problems encountered. For example, when projection is performed by an ultrashort or short focal projector, it would suffer from uneven light emission. In other words, the nearer a region from the projector, the more intense the projected light in the region. Therefore, the projected image might be too bright in some region and a glare problem might be adversely caused. On the other hand, the projected image might be too dark in another region, and could not be clearly viewed.

SUMMARY OF THE INVENTION

The present invention provides a transparent film adapted to be used with a projector, which can modulate light emitted directly from the projector to eyes of viewers.

The present invention provides a transparent film adapted to be used with a projector, which can scatter light projected thereon to exempt from light intensity variations with regions.

The present invention also provides a projecting system, which allows image projection on a transparent film to be conducted with a variety of orientations of light with minimized light emission directly from a projector to eyes of viewers.

An aspect of the present invention provides a transparent film adapted to be used with a projector which emits a projected light. The transparent film comprises a transparent substrate; a light-scattering layer disposed at an upstream position of the transparent substrate with respect to the projected light, and including a plurality of microstructures configured to scatter the projected light; and a light-blocking layer disposed at an upstream position of the light-scattering layer with respect to the projected light, and including a plurality of separate light-blocking units, which are configured to partially block the projected light and partially allow the projected light to reach the light-scattering layer.

Another aspect of the present invention provides a transparent film adapted to be used with a projector which emits a projected light. The transparent film comprises a transparent substrate; and a light-scattering layer disposed at an upstream position of the transparent substrate with respect to the projected light, and including a plurality of microstructures configured to scatter the projected light, wherein the microstructures are allocated with increasing spacings along a specified direction.

A further aspect of the present invention provides a projector and a transparent screen. The transparent film as described above is suitable to be used as the transparent screen.

BRIEF DESCRIPTION OF THE DRAWINGS

The invention will become more readily apparent to those ordinarily skilled in the art after reviewing the following detailed description and accompanying drawings, in which.

DETAILED DESCRIPTION OF PREFERRED EMBODIMENTS

The invention will now be described more specifically with reference to the following embodiments. It is to be noted that the following descriptions of preferred embodiments of this invention are presented herein for purpose of illustration and description only. For example, the expressions relating to directions such as over, under, left and right, are presented with reference to the annexed drawings. It is not intended to be exhaustive or to be limited to the precise form disclosed.

Figure 1:
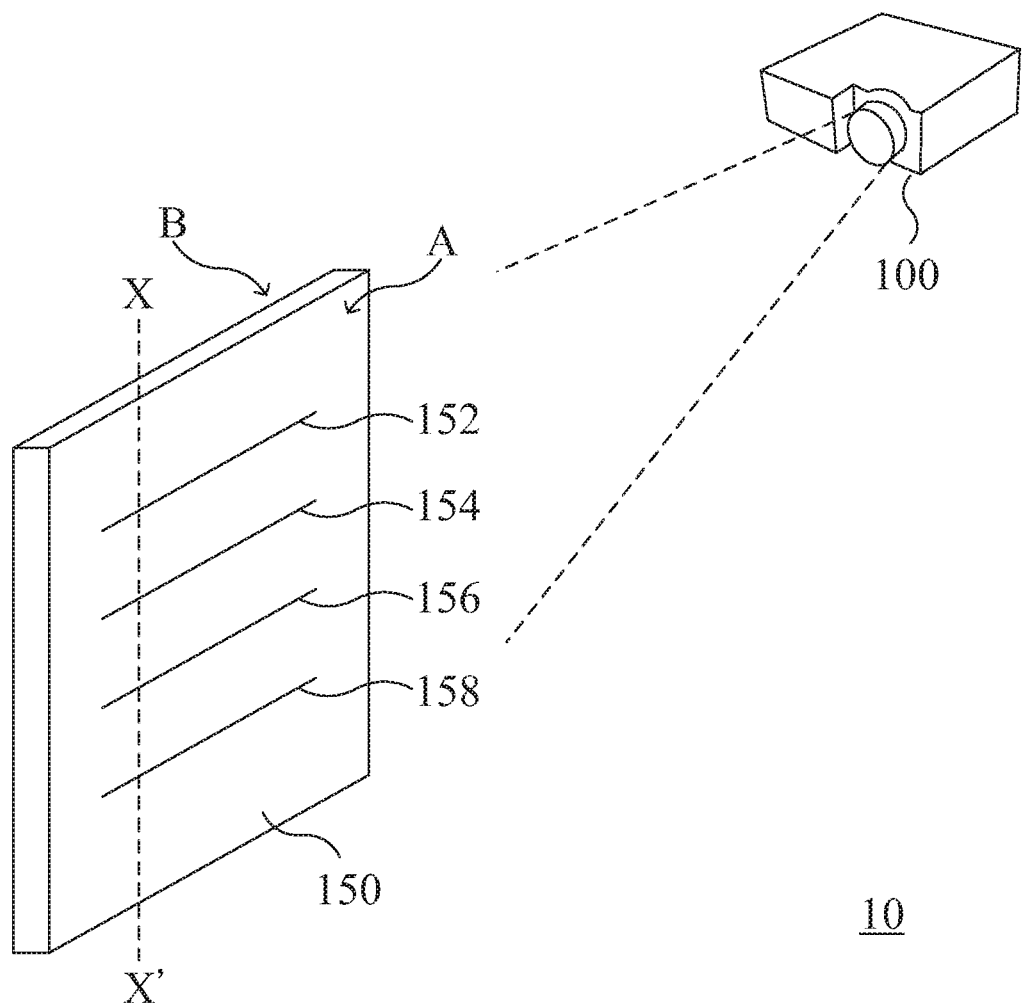
FIG. 1 is a schematic diagram illustrating a projecting system according to an embodiment of the present invention.

Please refer to FIG. 1, which schematically illustrates a projecting system according to an embodiment of the present invention. As shown in FIG. 1, the projecting system 10 includes a projector 100 and a projection screen 150. Light from the projector 100 is projected onto the transparent screen 150 from an upper level at a side A, and reflectively scattered and transmissively scattered by the transparent screen 150 to be shown at both the side A and an opposite side B of the transparent screen 150. In this way, viewers at both sides A and B of the transparent screen 150 can watch the projected images. In the projecting system 10 of the present invention, the projector 100 may be an ultra-short or short focal projector, or any other suitable projector, depending on practical requirements. In order to project the light from the projector 100 onto the transparent screen 150 to present an image, the transparent screen 150 needs to be able to scatter light emitted thereon. Therefore, the transparent screen 150 includes scattering members 152, 154, 156 and 158 as shown, which will be described in detail as follows.

Figure 2:
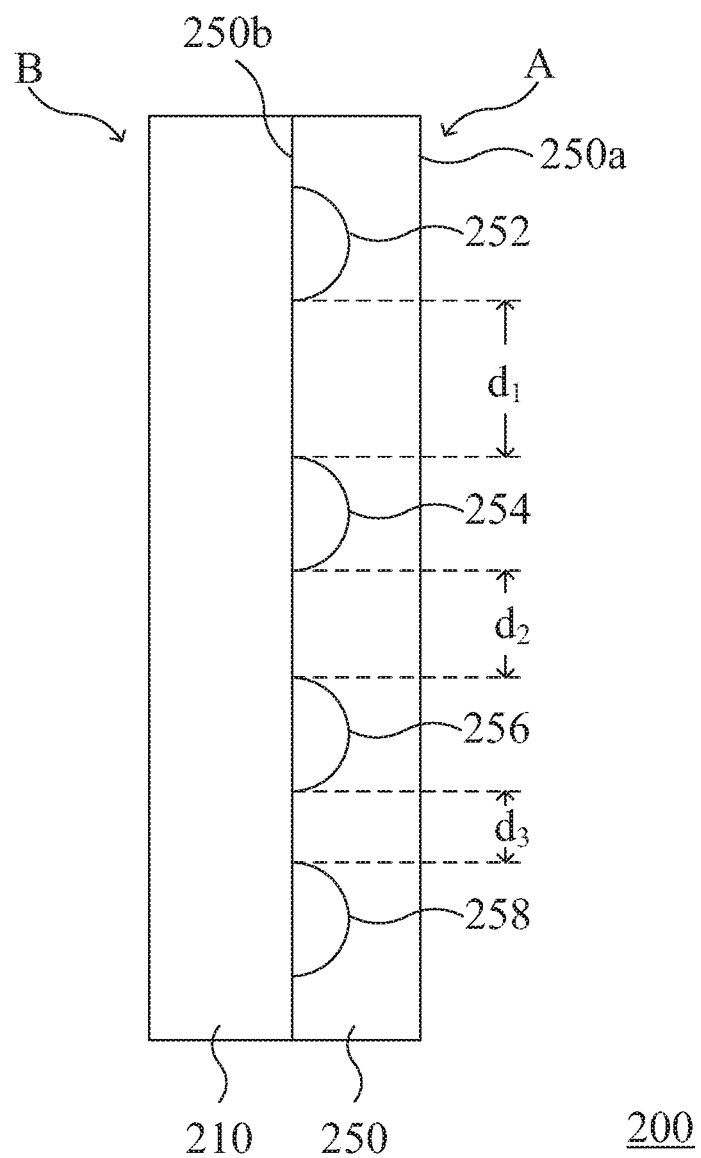
FIG. 2 is a cross-sectional view of an embodiment of a transparent screen included in the projecting system as shown in FIG. 1, which is taken along the X-X' line.

Please further refer to FIG. 2, which schematically illustrates a cross-sectional view taken along the X-X' line shown in FIG. 1. In this embodiment, the transparent screen 150 of FIG. 1 is implemented with a transparent film 200, which includes a transparent substrate 210 and a light-scattering layer 250 formed on the transparent substrate 210. The light-scattering layer 250 has a first surface 250a and a second surface 250b opposite to the first surface 250a and contiguous with the transparent substrate 210. In other words, with respect to the projected light, the light-scattering layer 250 is disposed at an upstream position of the transparent substrate 210. Between the first surface 250a and the second surface 250b, a plurality of microstructures 252, 254, 256 and 258 are allocated for light dispersion. Light is emitted from a projector 100 disposed at the side A of the transparent film 200. The light enters the transparent film 200 from the surface 250a of the light-scattering layer 250 and partially scattered by the microstructures 252, 254, 256 and 258. A portion of the light is reflectively scattered to reach the eyes of viewers at the side A, and meanwhile, another portion of the light is transmissively scattered to penetrate through the surface 250b and the transparent substrate 210 and reach the eyes of viewers at the side B.

In this embodiment, the microstructures 252, 254, 256 and 258 is dome-shaped, as shown in FIG. 2. Furthermore, the distances between pairs of the microstructures 252, 254, 256 and 258 are different. For example, the distance $d_1$ between the microstructure 252 and the microstructure 254 is greater than the distance $d_2$ between the microstructure 254 and the microstructure 256, and distance $d_2$ between the microstructure 254 and the microstructure 256 is greater than the distance $d_3$ between the microstructure 256 and the microstructure 258. In such a configuration, the density of the microstructures is increasing downwards.

Since the projector 100 is disposed at an upper level at the side A, and light is projected onto the transparent film 200 slantingly, the light intensity in an upper region of the transparent film 200 is higher than that in a lower region of the transparent film 200. Therefore, by allocating a plurality of microstructures, e.g. the microstructures 252, 254, 256 and 258 or more, on the transparent substrate 210 in a differentially spaced manner, a light compensation effect can be achieved to unify brightness of the light distributed all over the transparent film 200. Likewise, if the projector 100 is disposed at a lower level, and light is projected onto the transparent film 200 slantingly, the light intensity in an upper region of the transparent film 200 would be lower than that in a lower region of the transparent film 200. Therefore, by allocating a plurality of microstructures on the transparent substrate 210 in a manner that the density of the microstructures is increasing upwards, a light compensation effect can be achieved to unify brightness of the light distributed all over the transparent film 200. In spite the microstructures are allocated in parallel to and aligned with one another along a vertical direction and differentially spaced in the above embodiments, it is also feasible to allocate the microstructures in other manners, e.g. staggering in the vertical direction or distribution in two or more directions with the same or different spacings between adjacent two microstructure, as long as uniform brightness of projected light on the transparent film 200 can be achieved. For example, the microstructures may be divided into groups, and the microstructures in the same group may be arbitrarily distributed and oriented as long as the amount of the microstructures and the average density of the microstructures in each group are enough for modulating the overall light-scattering performance as desired.

In the above embodiments, the microstructures 252, 254, 256 and 258 are all dome-shaped. Alternatively, they may have other shapes that allow light to be reflectively or transmissively scattered thereby, and may have either the same or different shapes.

Figure 3A:
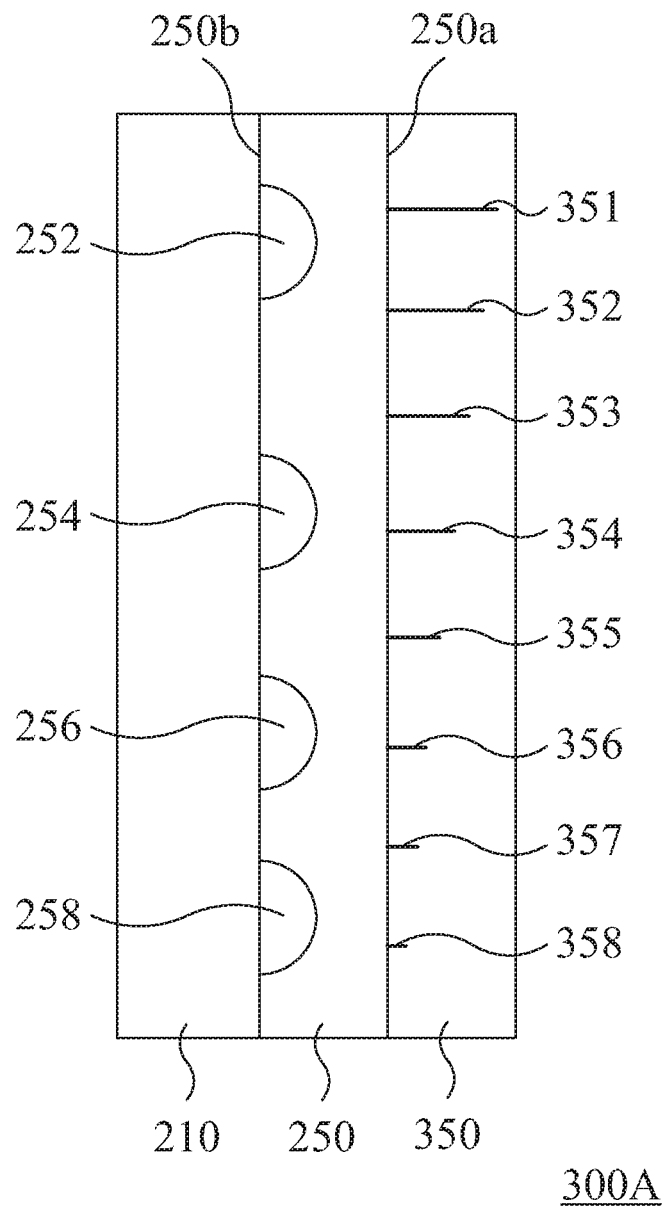
FIG. 3A is a cross-sectional view of another embodiment of the transparent screen included in the projecting system as shown in FIG. 1, which is taken along the X-X' line.

FIG. 3A schematically illustrates another embodiment of the transparent screen included in the projecting system as shown in FIG. 1, which is taken along the X-X' line. In this embodiment, the transparent screen 150 shown in FIG. 1 is implemented with a transparent film 300A, which also includes a transparent substrate 210, and a light-scattering layer 250 formed on the transparent substrate 210, and the light-scattering layer 250 has a first surface 250a and a second surface 250b opposite to the first surface 250a and contiguous with the transparent substrate 210, between which a plurality of microstructures 252, 254, 256 and 258 are allocated for light dispersion. In addition, the transparent film 300A includes a light-blocking layer 350, which is contiguous with the surface 250a of the light-scattering layer 250. In other words, with respect to the projected light, the light-scattering layer 250 is disposed at an upstream position of the transparent substrate 210, and the light-blocking layer 350 is disposed at an upstream position of the light-scattering layer 250. The light-blocking layer 350 includes a plurality of light-blocking units 351-358, which are separate from one another so that the projected light can penetrate into the light-scattering layer 250 from the gaps among the light-blocking units 351-358.

For example, each of the light-blocking units 351-358 is implemented with or includes a single piece of opaque light-blocking film, and the levels of the light-blocking units 351-358 protruding from the surface 250a of the light-scattering layer 250 are decreasing along the downward direction. That is, the light-blocking unit 351 protruding from the surface 250a of the light-scattering layer 250 more than the light-blocking unit 352, the light-blocking unit 352 protruding from the surface 250a of the light-scattering layer 250 more than the light-blocking unit 353, and so on. The light emitted from the projector 10 is projected onto the transparent film 300A, and partially blocked from entering the transparent film 300A by the light-blocking units 351-358. Moreover, an incident angle of the light portion entering the light-scattering layer 250 would be differentially affected by the light-blocking units 351-358 of different levels and the position of the projector 10 relative to the transparent film 300A. It is understood that on conditions of a constant distance between the projector 10 and the transparent film 300A and the same locations of the light-blocking units 351-358, the greater the protruding level of the light-blocking unit from the surface 250a, the more the amount of the projected light blocked by the light-blocking unit. Meanwhile, the greater the protruding level of the light-blocking unit from the surface 250a, the smaller the incident angle of the light portion unblocked by the light-blocking unit and entering the light-scattering layer 250. Therefore, the direct light emission into the eyes of viewers can be ameliorated. Accordingly, directions of the projected light can be properly modulated by designing the configurations of the light-blocking units 351-358. It is understood by those skilled in the art that the amount and positions of the light-blocking units contained in the light-blocking layer 350 may vary with practical requirements.

Figure 3B:
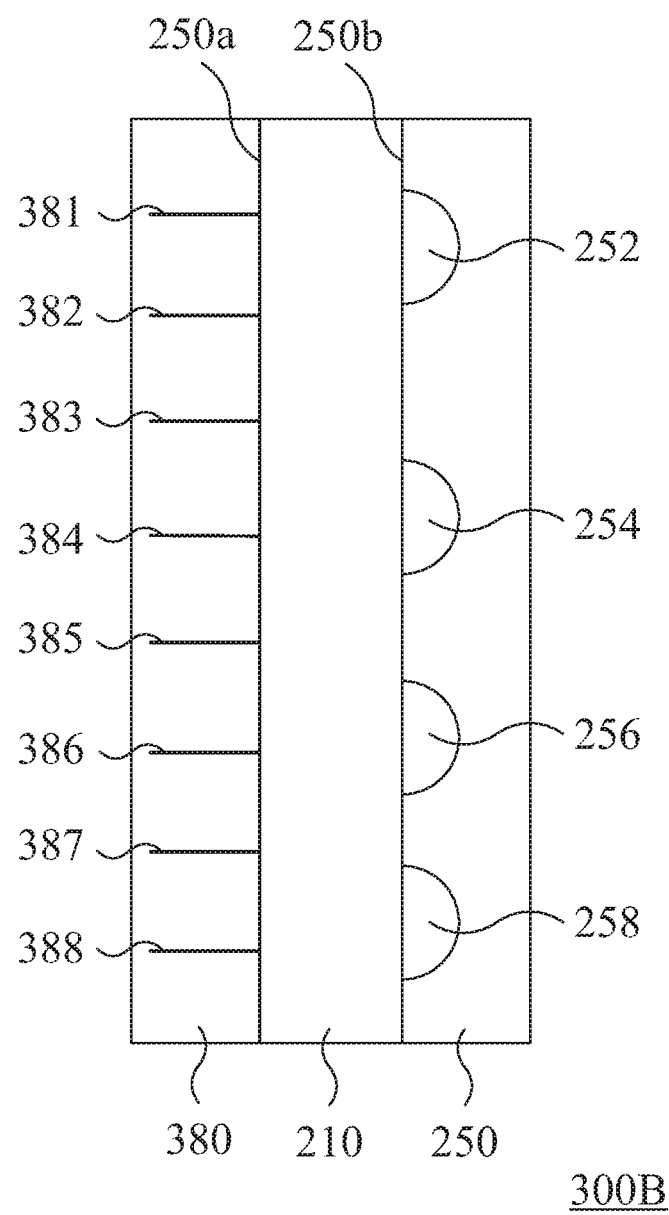
FIG. 3B is a cross-sectional view of a further embodiment of the transparent screen included in the projecting system as shown in FIG. 1, which is taken along the X-X' line.

In another embodiment, as illustrated in FIG. 3B, the transparent screen 150 is implemented with a transparent film 300B, which includes a transparent substrate 210, a light-scattering layer 250, microstructures 252, 254, 256 and 258 and a light-blocking layer 380. In this embodiment, the light-blocking layer 380 is disposed on a side 210a of the transparent substrate 210 and opposite to the light-scattering layer 250, and includes a plurality of light-blocking units 381-388. The transparent substrate 210, light-scattering layer 250 and microstructures 252, 254, 256 and 258 used in the embodiment shown in FIG. 3A may be used herein. The light-blocking units 381-388 are separate from one another and function for blocking external light, e.g. sunlight or lamplight, from the side B of the transparent screen 150 (see FIG. 1) from entering the transparent substrate 210 and adversely affecting the imaging on the transparent film 300B.

In this embodiment, the light-blocking units 381-388 are equally spaced in the light-blocking layer 380 and protrude from the surface 210a of the transparent substrate 210 at the same level. Alternatively, the spacings between pairs of adjacent light-blocking units and the levels of the light-blocking units protruding from the surface 210a may vary with practical requirements. In an alternative embodiment, the light-blocking layer 350 as illustrated in FIG. 3A and the light-blocking layer 380 as illustrated in FIG. 3B may be included in the same transparent film according to the present invention.

Hereinafter, how a light-blocking unit affects the incident angle of projected light into the light-scattering layer will be described in more detail.

Figure 4A:
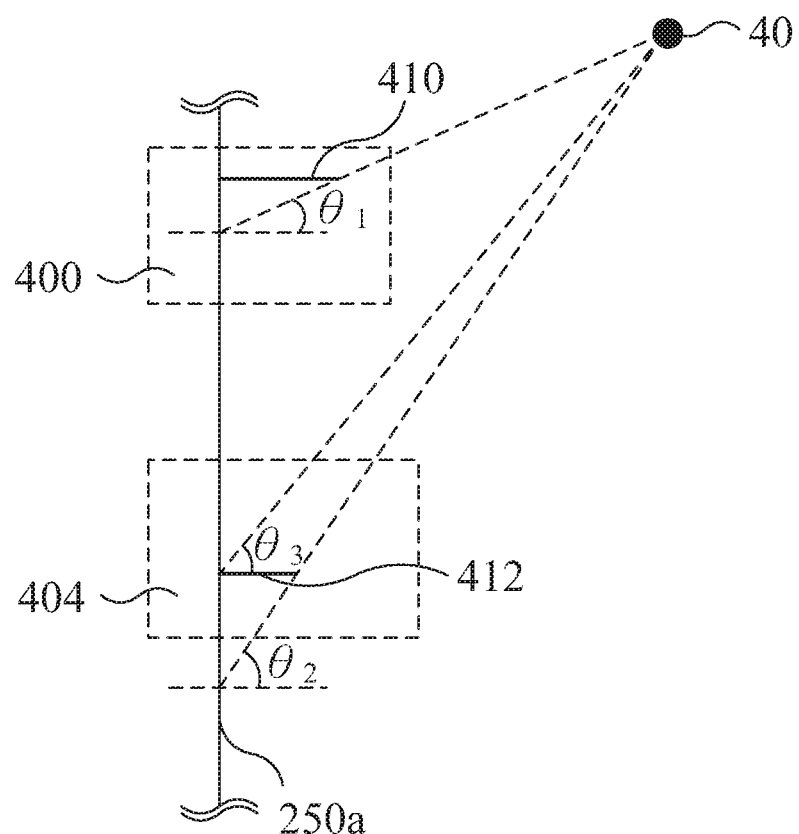
FIG. 4A is a schematic diagram illustrating an example of light-blocking units included in a transparent film according to the present invention.

Referring to FIG. 4A, an enlarged view of light-blocking units according to an embodiment of the present invention is schematically illustrated. As shown, the light-blocking units 400 and 404 are disposed on the surface 250a of the light-scattering layer 250 at an upper position and a lower position, respectively. Meanwhile, each of the light-blocking units 400 and 404 is implemented with or includes a single piece of light-blocking film 410/412. The single piece of light-blocking film 410 protrudes from the surface 250a at a level higher than a level of the single piece of light-blocking film 412 protruding from the surface 250a. A projector 40 is installed on an upper position as shown and emits light as indicated by dash lines. The projected light is partially and differentially blocked by the light-blocking films 410 and 412. For the larger and closer light-blocking film 410, a portion of the projected light, which has an incident angle smaller than $\theta_1$ relative to a normal line of the surface 250a will be blocked by the light-blocking film 410, and the light portion passing by the light-blocking film 410 reaches the surface 250a of the light-scattering layer 250 between the light-blocking film 410 and the light-blocking film 412 with an incident angle ranged between $\theta_1$ and $\theta_3$ relative to the normal line of the surface 250a. Likewise, a portion of the projected light, which has an incident angle smaller than +$\theta_2$ relative to a normal line of the surface 250a will be blocked by the light-blocking film 412, and the light portion passing by the light-blocking film 412 reaches the surface 250a of the light-scattering layer 250 next to the light-blocking film 412 with an incident angle greater than $\theta_2$ relative to the normal line of the surface 250a. It is understood that the angles $\theta_1$, $\theta_2$ and $\theta_3$ would vary with the sizes and the positions of the light-blocking films, as well as the relative positions of the projector 40 and the surface 250a of the light-scattering layer 250. The amount and intensity of light reaching the viewers through the surface 250a of the light-scattering layer 250 would be also affected by the spacings among the light-blocking films.

Figure 4B:
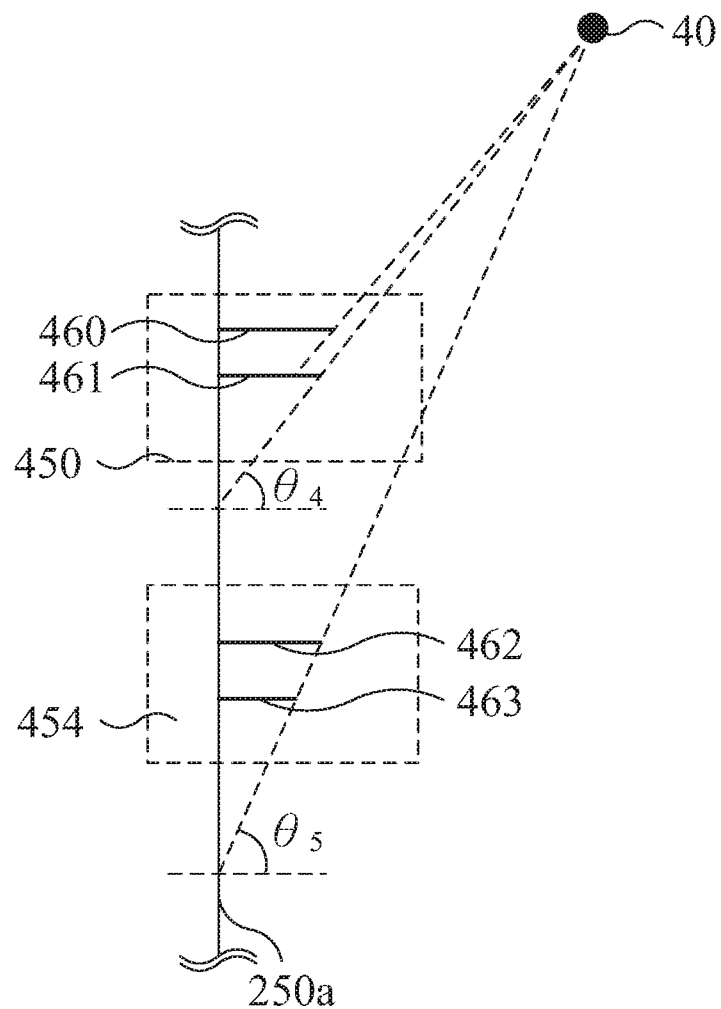
FIG. 4B is a schematic diagram illustrating another example of light-blocking units included in a transparent film according to the present invention.
Figure 5A:
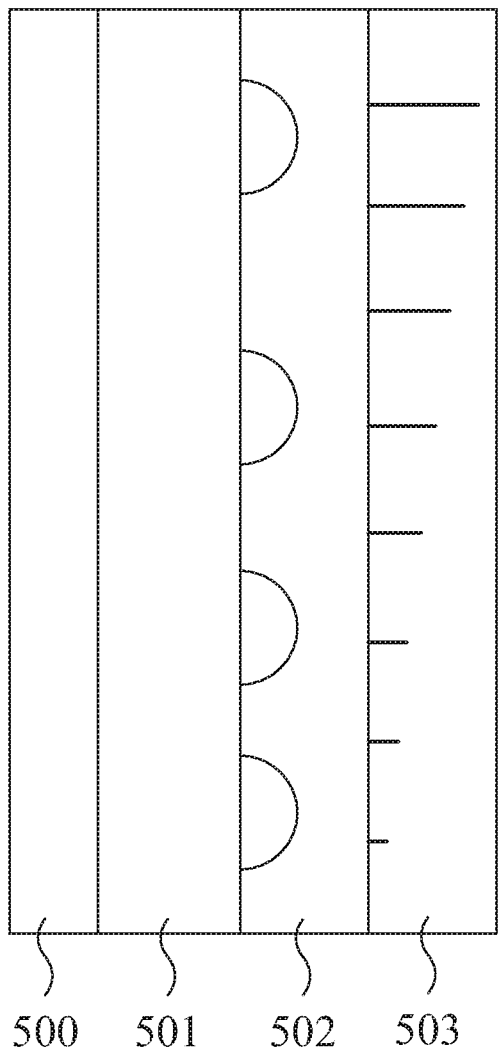
FIGS. 5A-5D are schematic diagrams illustrating examples of transparent films according to the present invention, each of which includes a light-modulating layer.
Figure 5B:
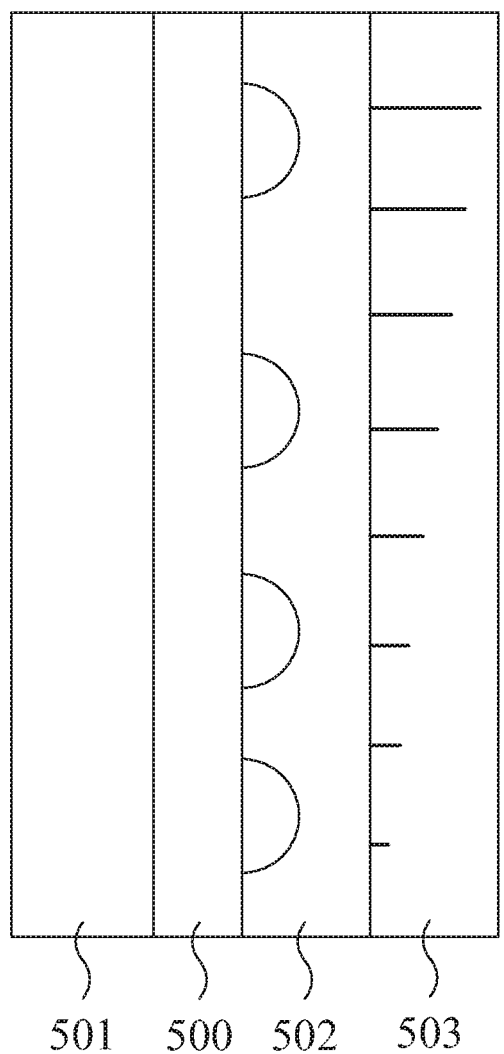
Figure 5C:
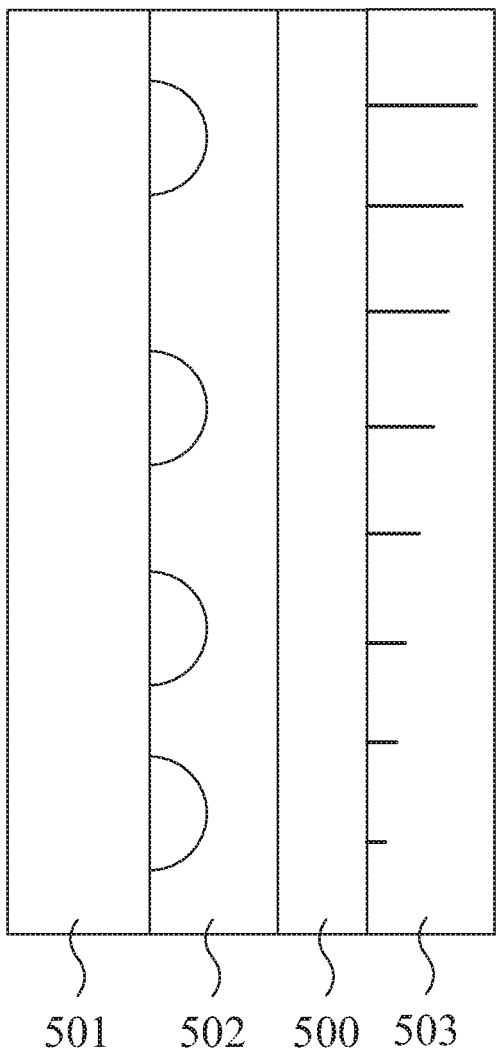
Figure 5D:
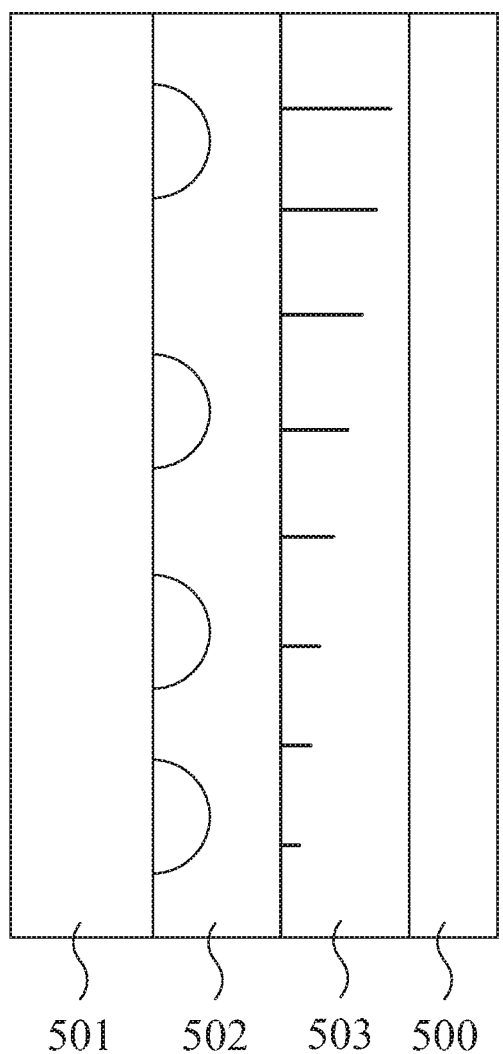

FIG. 4B schematically illustrates another example of light-blocking units included in a transparent film according to the present invention. As shown, the light-blocking units 450 and 454 are disposed on the surface 250a of the light-scattering layer 250 at an upper position and a lower position, respectively. Meanwhile, the light-blocking unit 450 is implemented with or includes two pieces of light-blocking films 460 and 461, and the light-blocking unit 454 is implemented with or includes two pieces of light-blocking films 462 and 463. The light-blocking film 460 protrudes from the surface 250a at a level higher than a level of the piece of light-blocking film 461 protruding from the surface 250a, and the light-blocking film 462 protrudes from the surface 250a at a level higher than a level of the piece of light-blocking film 463 protruding from the surface 250a. In this embodiment, the factors that determine the minimum value of the incident angle of the light for one light-blocking unit, in addition to the relative position of the projector 40 to the transparent film 250, include a ratio of a clearance between the two light-blocking films thereof to a level difference between the two light-blocking films, which is referred to as an aspect ratio hereinafter. Provided that the relative position of the projector 40 to the transparent film is fixed, the minimal incident angle of the projected light relative to a specified light-blocking unit varies with the aspect ratio of the two light-blocking films in that light-blocking unit.

For example, as shown, the projector 40 is installed on an upper position as shown and emits light as indicated by dash lines. The projected light is partially and differentially blocked by the light-blocking films 460, 461, 462 and 463. Taking the light-blocking unit 450 as an example, the light is partially blocked by the light-blocking film 460 and partially passing by the light-blocking film 460. The light portion passing by the light-blocking film 460 continues to proceed until reach the light-blocking film 461. Likewise, the light is partially blocked by the light-blocking film 461 and partially passing by the light-blocking film 461. Accordingly, the light portion, which has an incident angle smaller than $\theta_4$ relative to a normal line of the surface 250a will be blocked by the light-blocking films 460 and 461, and the light portion passing by the light-blocking films 460 and 461 reach the surface 250a of the light-scattering layer 250 next to the light-blocking film 461 with an incident angle greater than $\theta_4$ relative to the normal line of the surface 250a. If either or both of the clearance between the light-blocking films 460 and 461 and the levels of the light-blocking films 460 and 461 protruding from the surface 250a change, the minimal incident angle $\theta_4$ would change as well. Likewise, the minimal incident angle $\theta_5$ would change with either or both of the clearance between the light-blocking films 462 and 463 and the levels of the light-blocking films 460 and 461 protruding from the surface 250a. Furthermore, the amount and intensity of light reaching the viewers through the surface 250a of the light-scattering layer 250 would be also affected by the spacings among the light-blocking films. Meanwhile, the brightness of light projected onto the transparent film can be unified.

It is understood from the above descriptions that the light-blocking films are specifically configured to have proper spacings and protruding levels, as exemplified in the embodiment of FIG. 3A, to modulate the brightness of light projected onto the transparent film when the projector is disposed at an upper level. In contrast, in another embodiment that the projector is disposed at a lower level relative to the transparent film, the transparent film may be made upside down to reverse the configuration of the light-blocking films, thereby achieving the object of brightness modulation in a similar manner.

It is to be further understood that the light-blocking films may alternatively protruding from the surface 250a of the light-scattering layer 250 slantingly instead of standing uprightly. In this case, an effective protruding level of a light-blocking film is the vertical component normal to the surface 250a. Furthermore, an effective protruding level of a light-blocking unit is defined to be the greatest one of the one or more light-blocking films included in the light-blocking unit.

In the above embodiments and examples, a plurality of parameters, e.g. the amount of light-scattering microstructures and spacings thereamong, the amount of light-blocking films, protruding levels thereof and spacings thereamong, the relative position of the projector relative to the projection screen, etc., are mentioned for modulating the projected light. However, it is not necessary to adjust each of the parameters at the same time. Instead, the parameters may be selectively adjusted depending on practical requirements to design a suitable transparent film adapted to be used in a projecting system according to the present invention.

For further improving the modulation of brightness of light projected onto the transparent film, one or more light-modulating layers, e.g. light-polarizing layers and/or light-reflecting layers, may be included in the transparent film according to the present invention. Each the light-modulating layer may be disposed as an outer layer or an inner layer. For example, the light-modulating layer 500 may be disposed on a surface of the transparent substrate 501, which is opposite to the light-scattering layer 502, disposed between the transparent substrate 501 and the light-scattering layer 502, disposed between the light-blocking layer 503 and the light-scattering layer 502, or disposed on a surface of the light-blocking layer 503, which is opposite to the light-scattering layer 502, as schematically illustrated in FIGS. 5A-5D, respectively.

It is understood from the above descriptions that by providing a light-blocking layer as above-described at the inlet of light, glare can be avoided. Furthermore, by providing a light-scattering layer as above-described, projection of light on the transparent screen can be unified. Accordingly, the overall performance and practicability of the projecting system can be improved.

While the invention has been described in terms of what is presently considered to be the most practical and preferred embodiments, it is to be understood that the invention needs not be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:

1. A transparent film adapted to be used with a projector which emits a projected light, comprising:
   a transparent substrate;
   a light-scattering layer disposed at an upstream position of the transparent substrate with respect to the projected light, and including a plurality of microstructures configured to scatter the projected light; and
   a light-blocking layer disposed at an upstream position of the light-scattering layer with respect to the projected light, and including a plurality of separate light-blocking units, which are configured to partially block the projected light and partially allow the projected light to reach the light-scattering layer,
   wherein the light-blocking units are allocated with increasing spacings or decreasing spacings; each of the light-blocking units includes at least one light-blocking film protruding from a surface of the light-scattering layer at a specified level, and the light-blocking films are allocated with increasing protruding levels or decreasing protruding levels; or each of the light-blocking units includes a plurality of light-blocking films, which protrude from a surface of the light-scattering layer at different levels.

2. The transparent film according to claim 1, wherein each of the microstructures is dome-shaped.

3. The transparent film according to claim 1, further comprising a light-modulating layer disposed on a surface of the transparent substrate, which is opposite to the light-scattering layer, disposed between the transparent substrate and the light-scattering layer, disposed between the light-blocking layer and the light-scattering layer, or disposed on a surface of the light-blocking layer, which is opposite to the light-scattering layer.

4. A transparent film adapted to be used with a projector which emits a projected light, comprising:
   a transparent substrate; and
   a light-scattering layer disposed at an upstream position of the transparent substrate with respect to the projected light, and including a plurality of microstructures configured to scatter the projected light,
   wherein the microstructures are allocated with increasing spacings along a specified direction for unifying brightness of the projected light distributed all over the transparent film.

5. The transparent film according to claim 4, further comprising a light-blocking layer disposed at an upstream position of the light-scattering layer with respect to the projected light, and including a plurality of separate light-blocking units, which are configured to partially block the projected light and partially allow the projected light to reach the light-scattering layer.

6. The transparent film according to claim 5, wherein each of the light-blocking units includes at least one light-blocking film protruding from a surface of the light-scattering layer at a specified level, and the light-blocking films are allocated with increasing protruding levels or decreasing protruding levels.

7. The transparent film according to claim 5, wherein each of the light-blocking units includes a plurality of light-blocking films, which protrude from a surface of the light-scattering layer at different levels.

8. The transparent film according to claim 4, wherein each of the microstructures is dome-shaped.

9. The transparent film according to claim 4, further comprising a light-modulating layer disposed on a surface of the transparent substrate, which is opposite to the light-scattering layer, disposed between the transparent substrate and the light-scattering layer, disposed between the light-blocking layer and the light-scattering layer, or disposed on a surface of the light-blocking layer, which is opposite to the light-scattering layer.

10. The transparent film according to claim 4, further comprising a light-blocking layer disposed at a downstream position of the light-scattering layer with respect to the projected light, and including a plurality of separate light-blocking units, which are configured to partially block the projected light and partially allow the projected light to reach the light-scattering layer.

11. A projecting system, comprising:
a projector emitting a projected light; and
a transparent screen for showing a projected image in response to the projected light, comprising
a transparent substrate;
a light-scattering layer disposed at an upstream position of the transparent substrate with respect to the projected light, and including a plurality of microstructures configured to scatter the projected light; and
a light-blocking layer disposed at an upstream position of the light-scattering layer with respect to the projected light, and including a plurality of separate light-blocking units, which are configured to partially block the projected light and partially allow the projected light to reach the light-scattering layer,
wherein the light-blocking units are allocated with increasing spacings or decreasing spacings; each of the light-blocking units includes at least one light-blocking film protruding from a surface of the light-scattering layer at a specified level, and the light-blocking films are allocated with increasing protruding levels or decreasing protruding levels; or each of the light-blocking units includes a plurality of light-blocking films, which protrude from a surface of the light-scattering layer at different levels.

12. The projecting system according to claim 11, wherein each of the microstructures is dome-shaped.

13. The projecting system according to claim 11, further comprising a light-modulating layer disposed on a surface of the transparent substrate, which is opposite to the light-scattering layer, disposed between the transparent substrate and the light-scattering layer, disposed between the light-blocking layer and the light-scattering layer, or disposed on a surface of the light-blocking layer, which is opposite to the light-scattering layer.

14. The projecting system according to claim 11, wherein the projector is disposed at an upper position or a lower position relative to the transparent screen.

* * * * *